United States Patent
Brooks et al.

(10) Patent No.: US 10,891,381 B2
(45) Date of Patent: Jan. 12, 2021

(54) DETECTING VULNERABILITIES IN A WEB APPLICATION

(71) Applicant: ENTIT SOFTWARE LLC, Sanford, NC (US)

(72) Inventors: Jeremy Brooks, Alpharetta, GA (US); Sasi Siddharth Muthurajan, Cambridge, MA (US); Nidhi Govindram Kejriwal, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 109 days.

(21) Appl. No.: 15/775,198

(22) PCT Filed: Nov. 13, 2015

(86) PCT No.: PCT/US2015/060573
§ 371 (c)(1),
(2) Date: May 10, 2018

(87) PCT Pub. No.: WO2017/082921
PCT Pub. Date: May 18, 2017

(65) Prior Publication Data
US 2018/0330099 A1    Nov. 15, 2018

(51) Int. Cl.
G06F 21/00    (2013.01)
G06F 21/57    (2013.01)
G06F 16/28    (2019.01)
G06F 21/55    (2013.01)
G06F 21/12    (2013.01)

(52) U.S. Cl.
CPC .......... G06F 21/577 (2013.01); G06F 16/285 (2019.01); G06F 21/12 (2013.01); G06F 21/552 (2013.01); *G06F 2221/033* (2013.01)

(58) Field of Classification Search
CPC ....... G06F 21/577; G06F 16/285; G06F 21/12
USPC .......................................................... 726/25
See application file for complete search history.

(56) References Cited

U.S. PATENT DOCUMENTS

| | | | |
|---|---|---|---|
| 7,975,296 B2 | 7/2011 | Apfelbaum et al. | |
| 8,695,027 B2 | 4/2014 | Schrecker et al. | |
| 8,839,348 B2 | 9/2014 | Beskrovny et al. | |
| 8,925,051 B1 | 12/2014 | Pennington et al. | |
| 2006/0259973 A1 | 11/2006 | Sima et al. | |
| 2007/0094735 A1 | 4/2007 | Cohen et al. | |
| 2008/0120420 A1 | 5/2008 | Sima et al. | |
| 2009/0300749 A1* | 12/2009 | Delia ................... | H04L 63/083 726/12 |

(Continued)

OTHER PUBLICATIONS

Burnett, M., Symantec authentication audit guide: <http://www.symantec.com/connect/articles/auditing-web-site-authentication-part-one>, Apr. 24, 2003, 5 pages.

(Continued)

*Primary Examiner* — Anthony D Brown

(57) ABSTRACT

Examples relate to detecting vulnerabilities in a web application. One example enables identifying a set of inputs in a web application input form. The set of inputs may be categorized based on a set of predetermined conditions. The set of inputs may be scored based on the categorization. A subset of the set of inputs may be determined to be a set of parameters of interest for the web application based on the scored set of inputs.

20 Claims, 2 Drawing Sheets

---

410 IDENTIFYING A SET OF INPUTS IN A WEB APPLICATION INPUT FORM

420 CATEGORIZING THE SET OF INPUTS BASED ON A SET OF PREDETERMINED CONDITIONS

430 SCORING THE INPUTS BASED ON THE CATEGORIZATION AND A SET OF PREDETERMINED CONDITIONS ASSOCIATED WITH THE CATEGORIZATION

440 DETERMINING A SUBSET OF THE SET OF INPUTS AS A SET OF PARAMETERS OF INTEREST FOR THE WEB APPLICATION BASED ON THE SCORED SET OF INPUTS

(56) References Cited

U.S. PATENT DOCUMENTS

| | | |
|---|---|---|
| 2010/0114634 A1 | 5/2010 | Christiansen et al. |
| 2012/0284783 A1* | 11/2012 | Jakobsson ............... G06F 21/46 |
| | | 726/6 |
| 2014/0137257 A1 | 5/2014 | Cordero et al. |
| 2014/0282975 A1 | 9/2014 | Minszner |
| 2016/0189057 A1* | 6/2016 | Rao ....................... G06F 16/285 |
| | | 706/12 |

OTHER PUBLICATIONS

International Searching Authority., International Search Report and Written Opinion dated Aug. 30, 2016 for PCT Application No. PCT/US2015/060573 filed Nov. 13, 2015, 11 pages.

OWASP, OWASP Authentication Cheat Sheet: <https://www.owasp.org/index.php/Authentication_Cheat_Sheet> Aug. 7, 2015, 13 pages.

Zhou, Y., et al., SSOScan: Automated Testing of Web Applications for Single Sign-on Vulnerabilities, Aug. 20-22, 2014, 23rd USENIX Security Symposium, 16 pages.

\* cited by examiner

DETECTING VULNERABILITIES IN A WEB APPLICATION

BACKGROUND

Systems scan applications to determine vulnerabilities. Applications may be accessed via a login or other web input form that obtains numerous types of information. Attacks may be made that attempt to take advantage of a web input form to an application.

BRIEF DESCRIPTION OF THE DRAWINGS

The following detailed description references the drawings, wherein.

DETAILED DESCRIPTION

Figure 1:
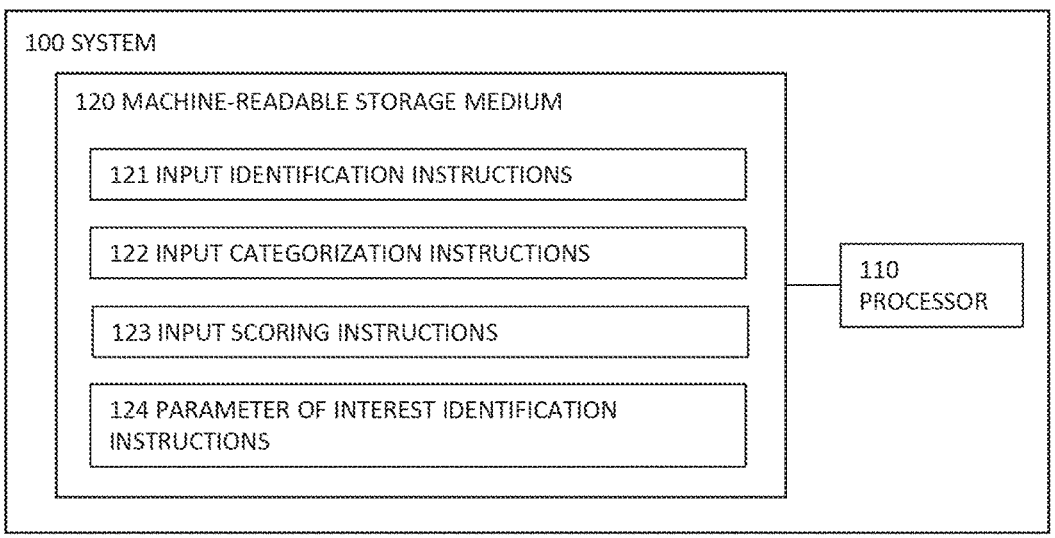
FIG. 1 is a block diagram of an example system for detecting vulnerabilities in a web application.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As mentioned above, systems scan applications to determine vulnerabilities. Applications may be accessed via a login or other web input form that obtains numerous types of information. Attacks may be made that attempt to take advantage of a web input form to an application.

Often, systems that act as application scanners detect vulnerabilities in an application when information is provided to the application (e.g., via a web application input form, login page, and/or other resource that accepts information from a user of the application). It may be difficult to detect vulnerabilities in a web application input form of an application. This technical challenge may arise because numerous inputs may be available via the web application input form, and it may be technically challenging to determine which inputs are of interest and could be violated. Relying on user configurable settings or user information about which inputs may be manipulated could be an incomplete solution, because a user may skip configuration or not provide required values as they maneuver the web application input form. Further brute force may be an inefficient and incomplete solution as well.

A new technical solution to this challenge involves a system that identifies parameters of interest in a web application input form. The system may use a classifier that may be created that inspects the input sequence. The system may categorize the inputs of the web page form based on predetermined conditions, score the inputs, and determine which inputs are parameters of interest based on their scores.

The system may first determine a set of inputs that are available via the web application input page.

In an example in which the web application input form comprises an event-based input form (e.g., an event-based login form, etc.), the system may determine the set of inputs that are available via the input form based on the actions performed by the user. To that end, the system may have knowledge of the values entered by the user and web form input types of the event-based input form, and may determine the set of inputs based on that knowledge. In some examples, in the initial determination of the set of inputs, the system may determine an initial category and score for each input based on the knowledge.

In an example in which the web application input form comprises a traffic-based input form (e.g., a traffic-based login form, etc.), the system may have access to the HTTP requests and responses that are communicated. In some examples, the system may not have user action information or knowledge of the actual values entered by the user. As such, the system may determine the set of inputs that are available via the input form by looking at the HTML form input fields in the HTTP response communicated to the user and may correlate the input fields with http request parameters in subsequent requests. In some examples, in the initial determination of the set of inputs, the system may determine an initial category and score for each input based on the found correlations.

The system may categorize each input (regardless of whether an initial category has been determined). A set of categories may be stored in a non-transitory machine readable storage medium accessible to the system. For each category, the non-transitory machine readable storage medium may store a predetermined set of conditions for each category.

The system may determine a category for an input based on which set of predetermined conditions most closely match the input and/or the data entered by the user responsive to receiving the input in the web application input form. For example, the system may determine the category based on a highest number of the predetermined conditions of a set of predetermined conditions matching the input and/or the entered data, based on a threshold amount of matching of the predetermined conditions and the input and/or the entered data, and/or based on other correlations between a set of conditions and the input and/or the entered data.

Responsive to determine a respective category for each input in the set of inputs, the system may score the inputs. In some examples, the system may score an input based on the set of predetermined conditions associated with the category determined for the input. The system may determine a subset of the predetermined conditions that are relevant to the input (e.g., a subset with the highest match to the input and/or entered data, a subset that includes all conditions that match above a predetermined threshold, and/or subsets determined in other manners). The system may determine a score based on a number of conditions in the subset of predetermined conditions, a calculation of an amount of matching of the conditions in the subset of predetermined conditions, and/or based on other calculations related to the subset of predetermined conditions.

In some examples, each predetermined condition may have a weight associated therewith. The system may determine the score for the input based on the weights associated with the determined subset of predetermined conditions that are relevant to the input. For example, the system may apply weights to the calculation performed that is related to the subset of predetermined conditions.

Responsive to determining a category and a score for each input, the system may determine a subset of the inputs as parameters of interest for the web application input form. In some examples, the system may determine the highest scored input in each category as the parameters of interest. In some examples, the system may determine a threshold of highest scored inputs regardless of category as the parameters of interest. The system may then determine vulnerabilities in the web application based on the set of parameters of interest.

In some examples, an initial set of categories and associated predetermined sets of conditions may be determined for the web application. The system may use a classifier to revise the set of categories and the sets of predetermined conditions associated with the set of categories. For example, each time the system analyzes an input form for the web application, the system may use the information obtained from the web application to revise one or more categories of the set of categories and may revise associated one or more predetermined sets of conditions associated with the respective one or more categories. In some examples, the classifier may also be used to optimize scoring and weights associated with the set of predetermined conditions.

Referring now to the drawings, FIG. 1 is a block diagram of an example system 100 for detecting vulnerabilities in a web application. In the example depicted in FIG. 1, system 100 includes a non-transitory machine-readable storage medium 120 and a processor 110.

Referring now to the drawings, FIG. 1 is a block diagram of an example system 100 for detecting vulnerabilities in a web application. System 100 may comprise a cloud server, a mainframe, notebook, desktop, tablet, workstation, mobile device, and/or any other device suitable for executing the functionality described below. In the embodiment of FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, 124, and/or other instructions to enable detecting vulnerabilities in a web application, as described below. As an alterative or in addition to retrieving and executing instructions, processor 110 may include one or more electronic circuits comprising a number of electronic components for performing the functionality of one or more of instructions 121, 122, 123, 124, and/or other instructions.

In one example, the program instructions 121, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Non-transitory machine-readable storage medium 120 may be any hardware storage device for maintaining data accessible to system 100. For example, machine-readable storage medium 120 may include one or more hard disk drives, solid state drives, tape drives, and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for detecting vulnerabilities in a web application. As detailed below, storage medium 120 may maintain and/or store the data and information described herein.

For example, storage medium 120 may maintain and/or store data and information related to detecting vulnerabilities in a web application. Storage medium 120 may store, for example, information related to a set of inputs of each web application input form of the application, classifier information, a set of categories, a set of predetermined conditions associated with each category in the set of categories, a set of weights associated with the set of predetermined conditions for each category, scoring information, and/or other information related to detecting vulnerabilities in a web application of the application.

Input identification instructions 121, when executed by processor 110, may identify a set of inputs in a web application input form. In some examples, the input identification instructions 121, when executed by processor 110, may determine a classifier to identify the set of inputs based on identifying previous sets of inputs in previous instances of the web application input form. In these examples, the input identification instructions 121, when executed by processor 110, may identify the set of inputs based on the determined classifier.

In an example in which the web application input form comprises an event-based input form (e.g., an event-based login form, etc.), the input identification instructions 121, when executed by processor 110, may determine the set of inputs that are available via the input form based on the actions performed by the user. To that end, the input identification instructions 121, when executed by processor 110, may have knowledge of the values entered by the user and web form input types of the event-based input form, and may determine the set of inputs based on that knowledge. In some examples, in the initial determination of the set of inputs, the input identification instructions 121, when executed by processor 110, may determine an initial category and score for each input based on the knowledge.

In an example in which the web application input form comprises a traffic-based input form (e.g., a traffic-based login form, etc.), the input identification instructions 121, when executed by processor 110, may have access to the HTTP requests and responses that are communicated. In some examples, the input identification instructions 121, when executed by processor 110, may not have user action information or knowledge of the actual values entered by the user. As such, the input identification instructions 121, when executed by processor 110, may determine the set of inputs that are available via the input form by looking at the HTML form input fields in the HTTP response communicated to the user and may correlate the input fields with http request parameters in subsequent requests. In some examples, in the initial determination of the set of inputs, the input identification instructions 121, when executed by processor 110, may determine an initial category and score for each input based on the found correlations.

The input categorization instructions 122, when executed by processor 110, may categorize the set of inputs based on a set of predetermined conditions. In some examples, the input categorization instructions 122, when executed by processor 110, may perform the second request responsive to performing the first request. The input categorization instructions 122, when executed by processor 110, may categorize each input (regardless of whether an initial category has been determined). A set of categories may be stored in non-transitory machine readable storage medium 120. For each category, the non-transitory machine readable storage medium 120 may store a predetermined set of conditions for each category.

The input categorization instructions 122, when executed by processor 110, may determine a category for an input based on which set of predetermined conditions most closely match the input and/or the data entered by the user responsive to receiving the input in the web application input form. For example, the input categorization instructions 122, when executed by processor 110, may determine the category based on a highest number of the predetermined conditions of a set of predetermined conditions matching the input and/or the entered data, based on a threshold amount of matching of the predetermined conditions and the input and/or the entered data, and/or based on other correlations between a set of conditions and the input and/or the entered data.

The input scoring instructions 123, when executed by processor 110, may score the set of inputs based on the categorization. For example, responsive to determine a respective category for each input in the set of inputs, the input scoring instructions 123, when executed by processor 110, may score the inputs. In some examples, the input scoring instructions 123, when executed by processor 110, may score an input based on the set of predetermined conditions associated with the category determined for the input. The input scoring instructions 123, when executed by processor 110, may determine a subset of the predetermined conditions that are relevant to the input (e.g., a subset with the highest match to the input and/or entered data, a subset that includes all conditions that match above a predetermined threshold, and/or subsets determined in other manners). The input scoring instructions 123, when executed by processor 110, may determine a score based on a number of conditions in the subset of predetermined conditions, a calculation of an amount of matching of the conditions in the subset of predetermined conditions, and/or based on other calculations related to the subset of predetermined conditions.

In some examples, each predetermined condition may have a weight associated therewith. The input scoring instructions 123, when executed by processor 110, may determine the score for the input based on the weights associated with the determined subset of predetermined conditions that are relevant to the input. For example, the input scoring instructions 123, when executed by processor 110, may apply weights to the calculation performed that is related to the subset of predetermined conditions.

The parameter of interest identification instructions 124, when executed by processor 110, may determine a subset of the set of inputs as a set of parameters of interest for the web application based on the scored set of inputs. For example, responsive to determining a category and a score for each input, the parameter of interest identification instructions 124, when executed by processor 110, may determine a subset of the inputs as parameters of interest for the web application input form. In some examples, the system may determine the highest scored input in each category as the parameters of interest. In some examples, the parameter of interest identification instructions 124, when executed by processor 110, may determine a threshold of highest scored inputs regardless of category as the parameters of interest. The parameter of interest identification instructions 124, when executed by processor 110, may then determine vulnerabilities in the web application based on the set of parameters of interest.

Figure 2:
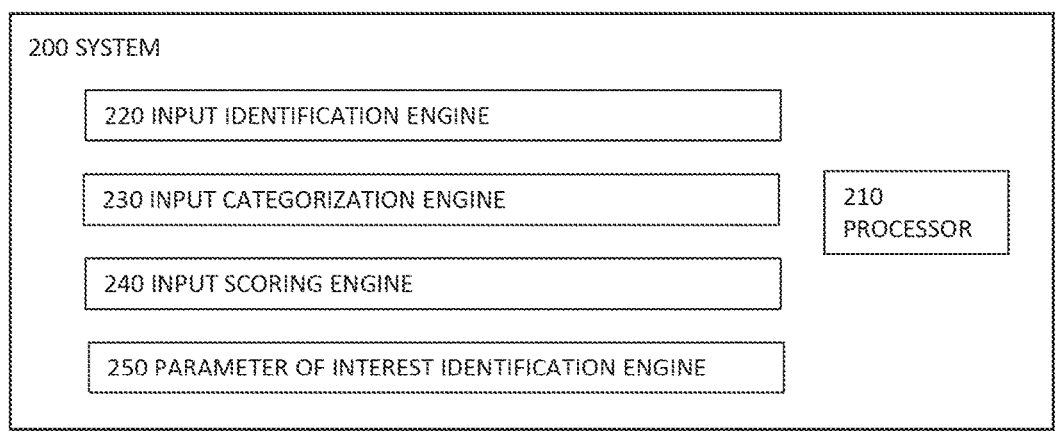
FIG. 2 is a block diagram of an example system for detecting vulnerabilities in a web application.

FIG. 2 is a block diagram of an example system 200 for detecting vulnerabilities in a web application. As with system 100, system 200 may comprise a cloud server, a mainframe, notebook, desktop, tablet, workstation, mobile device, and/or any other device suitable for executing the functionality described below. As with processor 110 of FIG. 1, processor 210 may be one or more CPUs, microprocessors, and/or other hardware devices suitable for retrieval and execution of instructions. The non-transitory machine readable storage of FIG. 2 may be the same as or similar to the storage medium 120 of FIG. 1. Non-transitory machine-readable storage medium of FIG. 2 may maintain and/or store data and information related to detecting vulnerabilities in a web application. The storage medium of FIG. 2 may store, for example, information related to a set of inputs of each web application input form of the application, classifier information, a set of categories, a set of predetermined conditions associated with each category in the set of categories, a set of weights associated with the set of predetermined conditions for each category, scoring information, and/or other information related to detecting vulnerabilities in a web application of the application. In some examples, the information stored by non-transitory machine-readable storage medium may be the same as or similar to information stored by non-transitory machine-readable storage medium 120

As detailed below, system 200 may include a series of engines 220-250 for detecting vulnerabilities in a web application. Each of the engines may generally represent any combination of hardware and programming. For example, the programming for the engines may be processor executable instructions stored on a non-transitory machine-readable storage medium and the hardware for the engines may include at least one processor of the system 200 to execute those instructions. In addition or as an alternative, each engine may include one or more hardware devices including electronic circuitry for implementing the functionality described below.

Input identification engine 220 may identify a set of inputs in a web application input form. In some examples, the application auditing engine 220 may identify a set of inputs in a web application input form in a manner the same as or similar to that of the input identification instructions 121 of system 100. Further details regarding an example implementation of input identification engine 220 are provided above in connection with input identification instructions 121 of FIG. 1.

Input categorization engine 230 may categorize the set of inputs based on a set of predetermined conditions. In some examples, the input categorization engine 230 may categorize the set of inputs in a manner the same as or similar to that of the input categorization instructions 122 of system 100. Further details regarding an example implementation of input categorization engine 230 are provided above in connection with input categorization instructions 122 of FIG. 1.

Input scoring engine 240 may score the set of inputs based on the categorization. In some examples, the input scoring engine 240 may score the set of inputs in a manner the same as or similar to that of the input scoring instructions 123 of system 100. Further details regarding an example implementation of input scoring engine 240 are provided above in connection with input scoring instructions 123 of FIG. 1.

Parameter of interest identification engine 250 may determine a subset of the set of inputs as a set of parameters of interest for the web application based on the scored set of inputs. In some examples, the parameter of interest identification engine 250 may determine the set of parameters of interest in a manner the same as or similar to that of the parameter of interest identification instructions 124 of system 100. Further details regarding an example implementation of parameter of interest identification engine 250 are provided above in connection with parameter of interest identification instructions 124 of FIG. 1.

Figure 3:
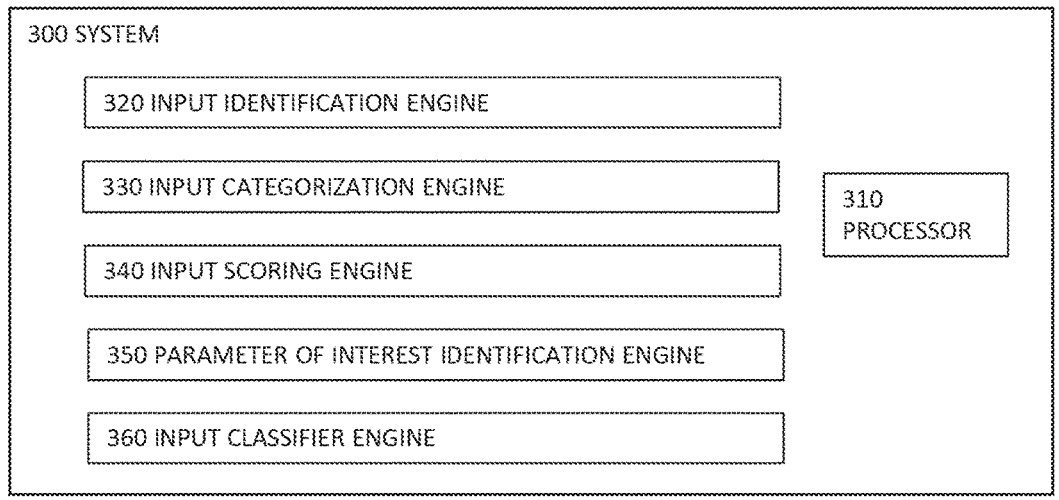
FIG. 3 is a block diagram of an example system for detecting vulnerabilities in a web application.

FIG. 3 is a block diagram of an example system for detecting vulnerabilities in a web application. As illustrated in FIG. 3 and described below, system 300 may comprise a processor 310, a non-transitory machine readable storage medium, a series of engines 320-330 for detecting vulnerabilities in a web application, and/or other components.

As with processor 110 of FIG. 1, processor 310 may be one or more CPUs, microprocessors, and/or other hardware devices suitable for retrieval and execution of instructions. As with machine-readable storage medium 120, non-transitory machine-readable storage medium may be any hardware storage device for maintaining data accessible to system 300. As with engines 220-250, engines 320-360 may generally represent any combination of hardware and programming.

Non-transitory machine-readable storage medium of FIG. 3 may be the same as or similar to the storage medium 120 of FIG. 1. Non-transitory machine-readable storage medium of FIG. 3 may maintain and/or store data and information related to detecting vulnerabilities in a web application. The storage medium of FIG. 3 may store, for example, information related to a set of inputs of each web application input form of the application, classifier information, a set of categories, a set of predetermined conditions associated with each category in the set of categories, a set of weights associated with the set of predetermined conditions for each category, scoring information, and/or other information related to detecting vulnerabilities in a web application of the application. In some examples, the information stored by non-transitory machine-readable storage medium may be the same as or similar to information stored by non-transitory machine-readable storage medium 120

Input identification engine 320 may perform functionality the same as or similar to that of the input identification engine 220 of system 200. Further details regarding an example implementation of input identification engine 320 are provided above in connection with input identification engine 220 of system 200.

Input categorization engine 330 may perform functionality the same as or similar to that of the input categorization engine 230 of FIG. 2. Further details regarding an example implementation of input categorization engine 330 are provided above in connection with input categorization engine 230 of FIG. 2.

Input scoring engine 340 may perform functionality the same as or similar to that of the input scoring engine 240 of FIG. 2. Further details regarding an example implementation of input scoring engine 340 are provided above in connection with input scoring engine 240 of FIG. 2.

Parameter of interest identification engine 350 may perform functionality the same as or similar to that of the parameter of interest identification engine 250 of FIG. 2. Further details regarding an example implementation of parameter of interest identification engine 350 are provided above in connection with parameter of interest identification engine 250 of FIG. 2.

Input classifier engine 360 may perform functionality the same as or similar to that of the system of FIG. 2. In some examples, the input classifier engine 360 may determine an initial set of categories and associated predetermined sets of conditions for the web application. The input classifier engine 360 may use a classifier to revise the set of categories and the sets of predetermined conditions associated with the set of categories. For example, each time the input classifier engine 360 analyzes an input form for the web application, the input classifier engine 360 may use the information obtained from the web application to revise one or more categories of the set of categories and may revise associated one or more predetermined sets of conditions associated with the respective one or more categories. In some examples, the input classifier engine 360 may also be used to optimize scoring and weights associated with the set of predetermined conditions. Further details regarding an example implementation of input classifier engine 360 are provided above in connection with the system of FIG. 2.

System 300 may perform other functionality related to detecting vulnerabilities in a web application as well and is not limited to the examples of detecting vulnerabilities in a web application functionality described herein.

Figure 4:
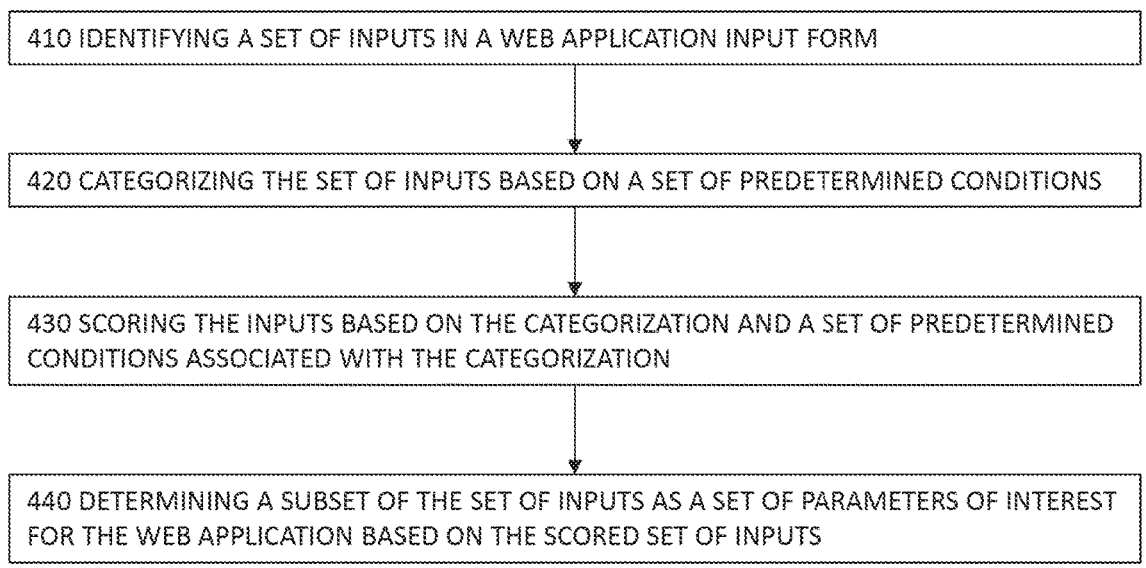
FIG. 4 is a flowchart of an example method for detecting vulnerabilities in a web application.

FIG. 4 is a flowchart of an example method for execution by a computing device for detecting vulnerabilities in a web application.

Although execution of the methods described below are with reference to system 100 of FIG. 1 system 200 of FIG. 2, and/or system 300 of FIG. 3, other suitable devices for execution of this method will be apparent to those of skill in the art. The method described in FIG. 4 and other figures may be implemented in the form of executable instructions stored on a machine-readable storage medium, such as storage medium 120, by one or more engines described herein, and/or in the form of electronic circuitry.

In an operation 410, a set of inputs in a web application input form may be identified. For example, the system 100 (and/or the input identification instructions 121, the input identification engine 220, or other resource of the system 100) may identify the set of inputs. The system 100 may identify the set of inputs in a manner similar or the same as that described above in relation to the execution of the input identification instructions 121, the input identification engine 220, input identification engine 320, and/or other resource of the system 100.

In an operation 420, the set of inputs may be categorized based on a set of predetermined conditions. For example, the system 100 (and/or the input categorization instructions 122, the input categorization engine 230, or other resource of the system 100) may categorize the set of inputs. The system 100 may categorize the set of inputs in a manner similar or the same as that described above in relation to the execution of the input categorization instructions 122, the input categorization engine 230, or other resource of the system 100.

In an operation 430, the set of inputs may be scored based on the categorization and the set of predetermined conditions associated with the categorization. For example, the system 100 (and/or the input scoring instructions 123, the input scoring engine 240, or other resource of the system 100) may score the set of inputs. The system 100 may score the set of inputs in a manner similar or the same as that described above in relation to the execution of the input scoring instructions 123, the input scoring engine 240, or other resource of the system 100.

In an operation 440, a subset of the set of inputs may be determined as a set of parameters of interest for the web application based on the scored set of inputs. For example, the system 100 (and/or the parameter of interest identification instructions 124, the parameter of interest identification engine 250, or other resource of the system 100) may determine the set of parameters of interest. The system 100 may determine the set of parameters of interest in a manner similar or the same as that described above in relation to the execution of the parameter of interest identification instructions 124, the parameter of interest identification engine 250, or other resource of the system 100.

The foregoing disclosure describes a number of example embodiments for detecting vulnerabilities in a web application. The disclosed examples may include systems, devices, computer-readable storage media, and methods for detecting vulnerabilities in a web application. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A system for detecting vulnerabilities in a web application, the system comprising:
   a physical processor implementing machine readable instructions stored on a non-transitory machine-readable storage medium that cause the system to:
   identify a set of inputs in a web application input form, the set of inputs comprising a plurality of input parameters associated with a plurality of input elements included in the web application input form;
   compare the set of inputs to a plurality of predetermined conditions associated with a plurality of input categories, wherein each input category is associated with a different subset of the plurality of predetermined conditions;
   select, for each input of the set of inputs, an input category of the plurality of input categories, wherein the selected input category is associated with a particular subset of the plurality of predetermined conditions with a highest number of matches to the input;
   score each input of the set of inputs based on the selected input category of the input;
   determine a subset of the set of inputs as a set of parameters of interest for the web application based on the scored set of inputs; and
   identify vulnerabilities of the web application input form based on the determined subset of the set of inputs.

2. The system of claim 1, wherein at least one input of the set of inputs is not included in the set of parameters of interest.

3. The system of claim 1, wherein the web application input form comprises an event based login form, and
   wherein the physical processor implements machine readable instructions that cause the system to:
   determine the set of inputs based on information about actions performed based on the event based login form; and
   provide, for each input of the set of inputs, an initial input category and an initial score based on the event based login form.

4. The system of claim 1, wherein the web application input form comprises a traffic based login form, and
   wherein the physical processor implements machine readable instructions that cause the system to:
   determine the set of parameters of interest by correlating parameters with information from a set of hypertext transfer protocol (HTTP) requests associated with the traffic based login form; and
   provide, for each parameter of the set of parameters of interest, an initial input category and an initial score based on the correlations.

5. The system of claim 1, wherein each of the plurality of predetermined conditions is associated with a weight, and wherein the physical processor implements machine readable instructions that cause the system to:
   score each input of the set of inputs based on the weights associated the plurality of predetermined conditions and the selected input category of the input.

6. The system of claim 4, wherein the physical processor implements machine readable instructions that cause the system to:
   revise, for each input in the set of inputs, the score for the input based on the particular subset of the plurality of predetermined conditions associated with the input category selected for the input.

7. The system of claim 6, wherein the physical processor implements machine readable instructions that cause the system to:
   revise, for each input, the score for the input based on the particular subset of the plurality of predetermined conditions and based on a set of weights associated with the particular subset of the plurality of predetermined conditions, wherein each weight in the particular subset of the plurality of weights is associated with a corresponding condition in the set of predetermined conditions.

8. The system of claim 4, wherein the physical processor implements machine readable instructions that cause the system to:
   determine, for each input category, an input of the set of inputs that has a highest score; and
   include, in the set of parameters of interest, the highest scored input of each input category.

9. The system of claim 1, wherein the physical processor implements machine readable instructions that cause the system to:
   include, in the set of parameters of interest, each input of the set of inputs with a score above a particular threshold.

10. A method for detecting vulnerabilities in a web application in a system, the system comprising a physical processor implementing computer readable instructions, the method comprising:

identifying, by the physical processor, a set of inputs in a web application input form, the set of inputs comprising a plurality of input parameters associated with a plurality of input elements included in the web application input form;

comparing, by the physical processor, the set of inputs to a plurality of predetermined conditions associated with a plurality of input categories, wherein each input category is associated with a different subset of the plurality of predetermined conditions;

selecting, by the physical processor, for each input of the set of inputs, an input category of the plurality of input categories, wherein the selected input category is associated with a particular subset of the plurality of predetermined conditions with a highest number of matches to the input;

scoring, by the physical processor, each input of the set of inputs based on the selected input category of the input;

determining, by the physical processor, a subset of the set of inputs as a set of parameters of interest for the web application based on the scored set of inputs; and identifying, by the physical processor, vulnerabilities of the web application input form based on the determined subset of the set of inputs.

11. The method of claim 10, wherein at least one input of the set of inputs is not included in the set of parameters of interest.

12. The method of claim 10, further comprising:

revising, by the physical processor, for each input, the score for the input based on the particular subset of the plurality of predetermined conditions and based on a set of weights associated with the particular subset of the plurality of predetermined conditions, wherein each weight in the set of weights is associated with a corresponding condition in the particular subset of the plurality of predetermined conditions.

13. The method of claim 12, further comprising:

determining, by the physical processor, for each input category, an input of the set of inputs that has a highest score; and including, by the physical processor, the highest scored input of each input category in the set of parameters of interest.

14. The method of claim 10, wherein each of the plurality of predetermined conditions is associated with a weight, and further comprising:

scoring, by the physical processor, each input in the set of inputs based on the weights associated the plurality of predetermined conditions and the selected input category of the input.

15. A non-transitory machine-readable storage medium comprising instructions for detecting vulnerabilities in a web application, the instructions executable by a physical processor of a system to:

identify a set of inputs in a web application input form based on a classifier that identifies inputs, the set of inputs comprising a plurality of input parameters associated with a plurality of input elements included in the web application input form;

compare the set of inputs to a plurality of predetermined conditions associated with a plurality of input categories, wherein each input category is associated with a different subset of the plurality of predetermined conditions;

select, for each input of the set of inputs, an input category of the plurality of input categories, wherein the selected input category is associated with a particular subset of the plurality of predetermined conditions with a highest number of matches to the input;

score each input of the set of inputs based on the selected input category of the input;

determine a subset of the set of inputs as a set of parameters of interest for the web application based on the scored set of inputs; and identify vulnerabilities of the web application input form based on the determined subset of the set of inputs.

16. The non-transitory machine-readable storage medium of claim 15, comprising instructions executable to:

determine, for each input category, an input of the set of inputs that has a highest score; and include, in the set of parameters of interest, the highest scored input of each input category.

17. The non-transitory machine-readable storage medium of claim 15, wherein the plurality of input parameters comprises a plurality of input fields of a hypertext transfer protocol (HTTP) response.

18. The non-transitory machine-readable storage medium of claim 15, wherein at least one input of the set of inputs is not included in the set of parameters of interest.

19. The system of claim 1, wherein the plurality of input parameters comprises a plurality of input fields of a hypertext transfer protocol (HTTP) response.

20. The method of claim 10, wherein the plurality of input parameters comprises a plurality of input fields of a hypertext transfer protocol (HTTP) response.

* * * * *